United States Patent [19]
Fletcher et al.
[11] 3,815,205
[45] June 11, 1974

[54] DEVICE FOR CONFIGURING MULTIPLE LEADS

[76] Inventors: James C. Fletcher, Administrator of the National Aeronautics and Space Administration with respect to an invention of; Paul W. Clemons, Paint Rock, Ala.

[22] Filed: Mar. 2, 1973

[21] Appl. No.: 337,487

[52] U.S. Cl. ........................................ 29/203 MW
[51] Int. Cl. ........................ H01r 43/00, H05k 3/32
[58] Field of Search ...... 29/203 MW, 203 P, 203 D, 29/203 R; 113/1 R

[56] References Cited
UNITED STATES PATENTS

| | | | |
|---|---|---|---|
| 3,650,232 | 3/1972 | Heinlen | 113/1 R |
| 3,693,228 | 9/1972 | Logan | 29/203 MW |

*Primary Examiner*—Thomas H. Eager
*Attorney, Agent, or Firm*—L. D. Wofford, Jr.; W. H. Riggins; J. R. Manning

[57] ABSTRACT

A device for simultaneously configuring multiple leads projected from a printed circuit affixed to a circuit board. The device is characterized by a receptacle adapted to receive and support a circuit board having multiple leads projected therefrom, a first locking mechanism for securing the base portion of the leads against motion relative to the circuit board and a second locking mechanism, spaced from the receptacle and mounted on a carriage for securing the distal end portions of the leads relative to the carriage. The carriage, in turn, is supported for a simultaneous motion in vertical and horizontal planes for imparting selective motion to the carriage, whereby leads secured by said locking mechanisms are deformed to a preselected configuration.

14 Claims, 8 Drawing Figures

DEVICE FOR CONFIGURING MULTIPLE LEADS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to devices for use in bending leads projected from circuit boards, frequently referred to as flat packs, and more particularly to an improved device for use in accurately and consistently bending projected leads to preselected angles for facilitating mechanical coupling of the leads within a selected circuit.

The prior art, of course, includes numerous devices, mechanisms, and the like particularly suited for use in bending leads of electronic circuits. Among such devices is the type disclosed in United States Letters Patent No. 3,650,232 which includes a descending tool for bending leads as the tool is moved downwardly. Of course, such devices are of a rather complex design and are intended to effect specific bending functions within substantially fixed parameters. Consequently, such devices are restricted in their application and thus fail to meet the existing needs, particularly in those instances wherein a limited number of simulated, configured circuit components are required.

It therefore is the purpose of the instant invention to provide an improved device for simultaneously configuring multiple leads, of various thicknesses, projected from circuit boards. As herein employed, the term circuit board is intended to refer to circuit boards upon which are affixed printed circuits including integrated circuits.

OBJECTS AND SUMMARY OF THE INVENTION

It is therefore an object of the instant invention to provide an improved device for simultaneously configuring multiple circuit leads.

It is another object to provide an improved device for simultaneously configuring multiple circuit leads to preselected angles.

It is another object to provide an improved device which can readily be employed for bending multiple circuit leads having lengths of approximately one-quarter of an inch, projected from circuit boards ranging from one-half inch square to two inches square.

It is another object to provide a manually operable device for simultaneously bending multiple leads projected from printed circuits mounted on circuit boards.

It is another object to provide an improved manually operable device for simultaneously bending multiple leads projected from circuits to preselected angles within a range extending between 90° and 180°.

These and other objects and advantages are achieved through the use of a device which includes a receptacle for a circuit board, an inboard lead lock supported in juxtaposition with the receptacle for securing projected leads against motion relative to a circuit board deposited on the receptacle and an outboard lead lock supported for motion in both vertical and horizontal planes for receiving and securing therein the distal ends of the projected leads whereby the leads are deformed to a configuration dictated by the extent of relative motion imparted to the lead locks, as will become more readily apparent by reference to the following description and claims in light of the accompanying drawings.

DESCRIPTION OF THE PREFERRED EMBODIMENT

Figures 1, 2:
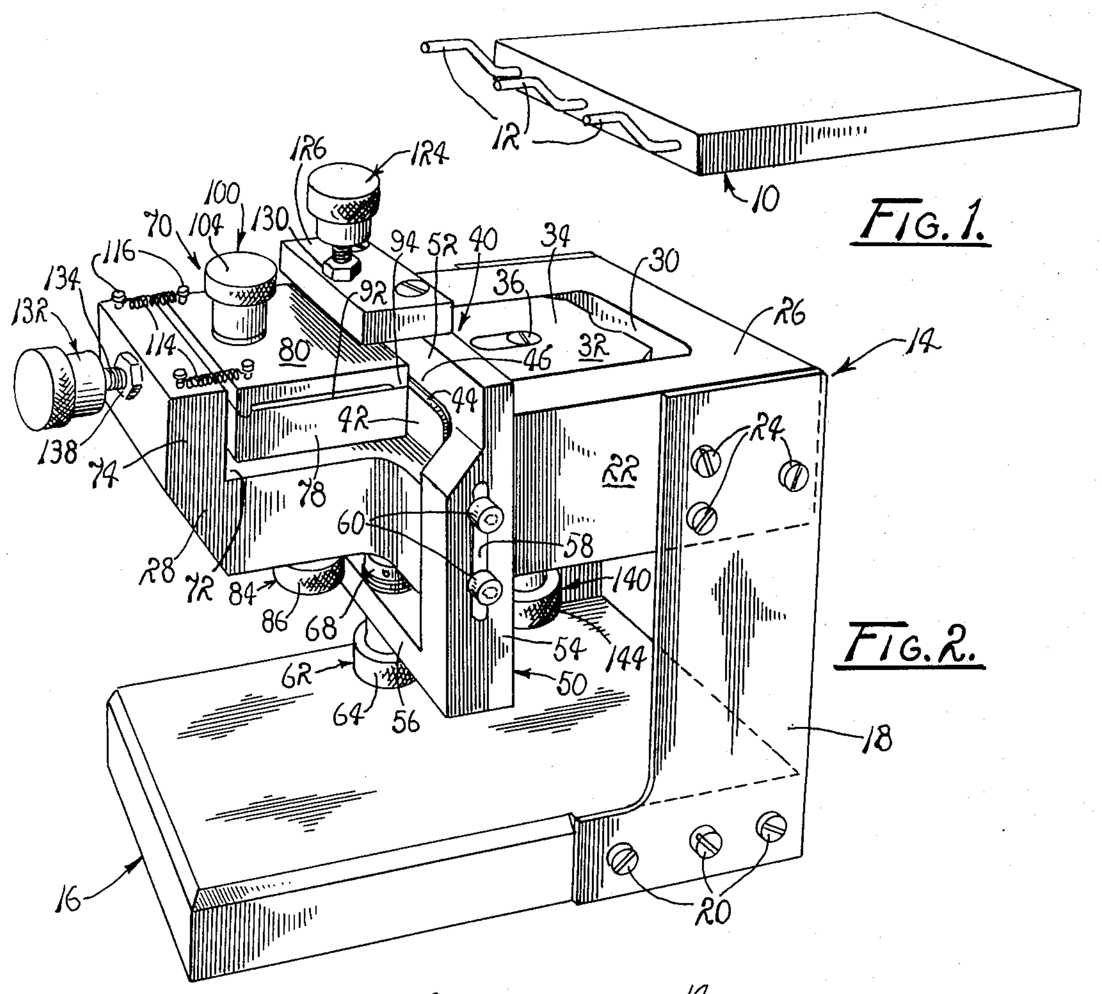
FIG. 1 is a perspective view of a schematic representation of a circuit board having multiple leads configured by the device which embodies the principles of the instant invention.
FIG. 2 is a perspective view of a device for bending boards which embodies the principles of the instant invention.
Figure 3:
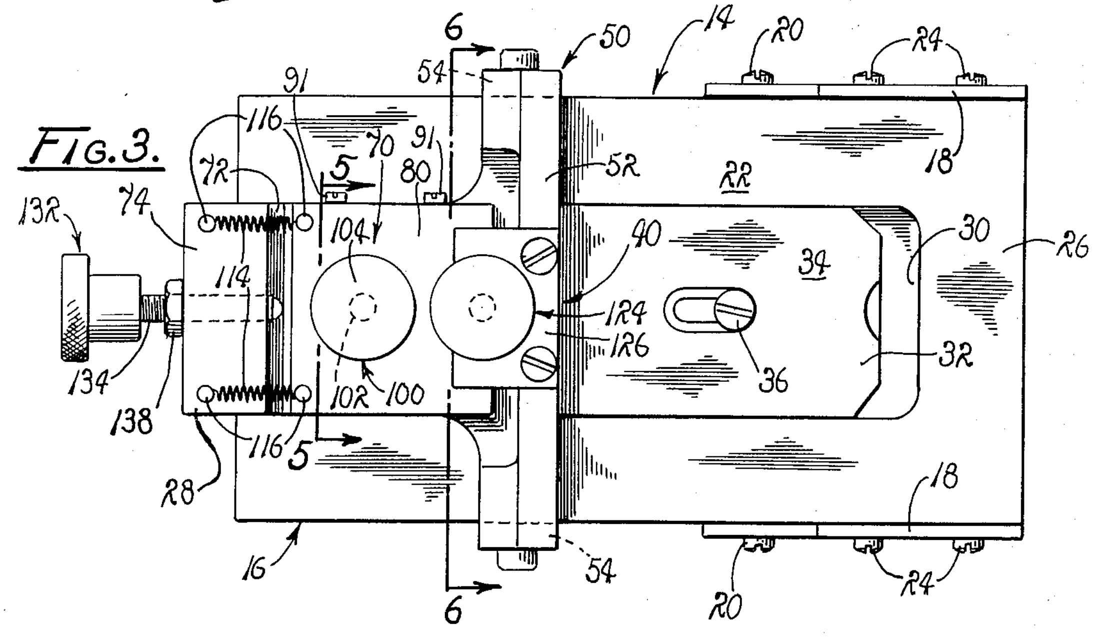
FIG. 3 is a top plan view of the device shown in FIG. 2.

Turning now to the drawings wherein like reference characters designate like or corresponding parts throughout their several views, there is shown in FIG. 1 a circuit board 10 having deformed leads 12 projected therefrom. The leads 12, as illustrated, have been configured employing a device 14 which embodies the principles of the instant invention. It is to be understood that the circuit board 10, as illustrated, represents circuit boards of various types without regard to their particular utility, size, or circuit components incorporated during fabrication.

As best illustrated in FIG. 2, the device 14 includes a base, generally designated 16, which preferably is configured to be seated on a work bench or the like. It is, however, to be understood that in the event it is desirable to incorporate the device 14 in a mechanically actuated mechanism, the base 16 can readily be varied to accommodate such incorporation.

A plurality of vertical supports 18 are affixed to the base 16, utilizing any suitable means including screws 20, and serve to support a frame 22. The frame 22 also is coupled with the supports 18 through any suitable means, including screws 24.

The frame 22 preferably is of a substantially planar configuration and includes a base end 26 and a head end 28. It should be readily apparent that the frame 22 can be fabricated employing suitably configured laminations. The base end 26 is configured to provide therein a relief 30 within which is seated a plate 32. This plate serves as a receptacle for a circuit board 10 having leads 12 projected therefrom to be configured employing the device 14. As a practical matter, the plate 32 is provided with a planar surface 34 upon which the circuit board 10 is deposited. Where desired, a setscrew 36 is provided for securing the plate 32 at predetermined locations within the relief 30. As a practical matter, the plate 32 can be provided with suitable connectors, not shown, through which the circuit board 10 is coupled therewith. However, in practice, it has been found that such means can successfully be deleted, as illustrated.

Immediately adjacent the relief 30, at the juncture of the base end 26 and head end 28 there is provided an inboard lead lock, generally designated 40. The lead lock 40 serves to receive leads 12 projected therethrough from the circuit board 10 as it is supported on the plate 32. In practice, the lead lock 40 includes an upstanding anvil 42, FIG. 4, integrally related with the frame 22. The anvil 42, in turn, includes a planar surface 44 which supports the projected leads 12. It is to be understood that the anvil 42 is of an elongated narrow configuration and spans the effective width of the relief 30 so that all leads 12 can be received without experiencing deformation.

Disposed immediately above the anvil 42, in a coplanar relationship therewith, there is an elongated, vertically movable blade 46 having a planar surface 48. This surface constitutes a mirror image of the planar surface 44 so that the leads 12 can be engaged thereby and secured therebetween as the blade 46 is moved downwardly toward the anvil 42.

The blade 46, in effect, is provided as a depending component of a yoke, generally designated 50, having a substantially rectangular configuration. The yoke 50 is of an integral configuration and includes an upper transverse beam 52, from which the blade 46 depends, a pair of vertically oriented support beams 54 suspended from the opposite ends of the beam 52 and a transversely oriented base beam 56 extended between the lower ends of the support beams 54. As a practical matter, each of the support beams 54 includes an elongated slot 58 through which is extended a pair of setscrews 60. The setscrews 60 preferably are received within internally threaded bores suitably provided in the frame 22 so that the support beams 54 can be secured to the frame at selected elevations simply by applying thereto suitable torque. Similarly, the setscrews 60 are loosened for releasing the support beams 54 so that the support beams are freed for accommodating a repositioning of the blade 46 relative to the anvil 42.

Figures 4, 5, 6, 7, 8:
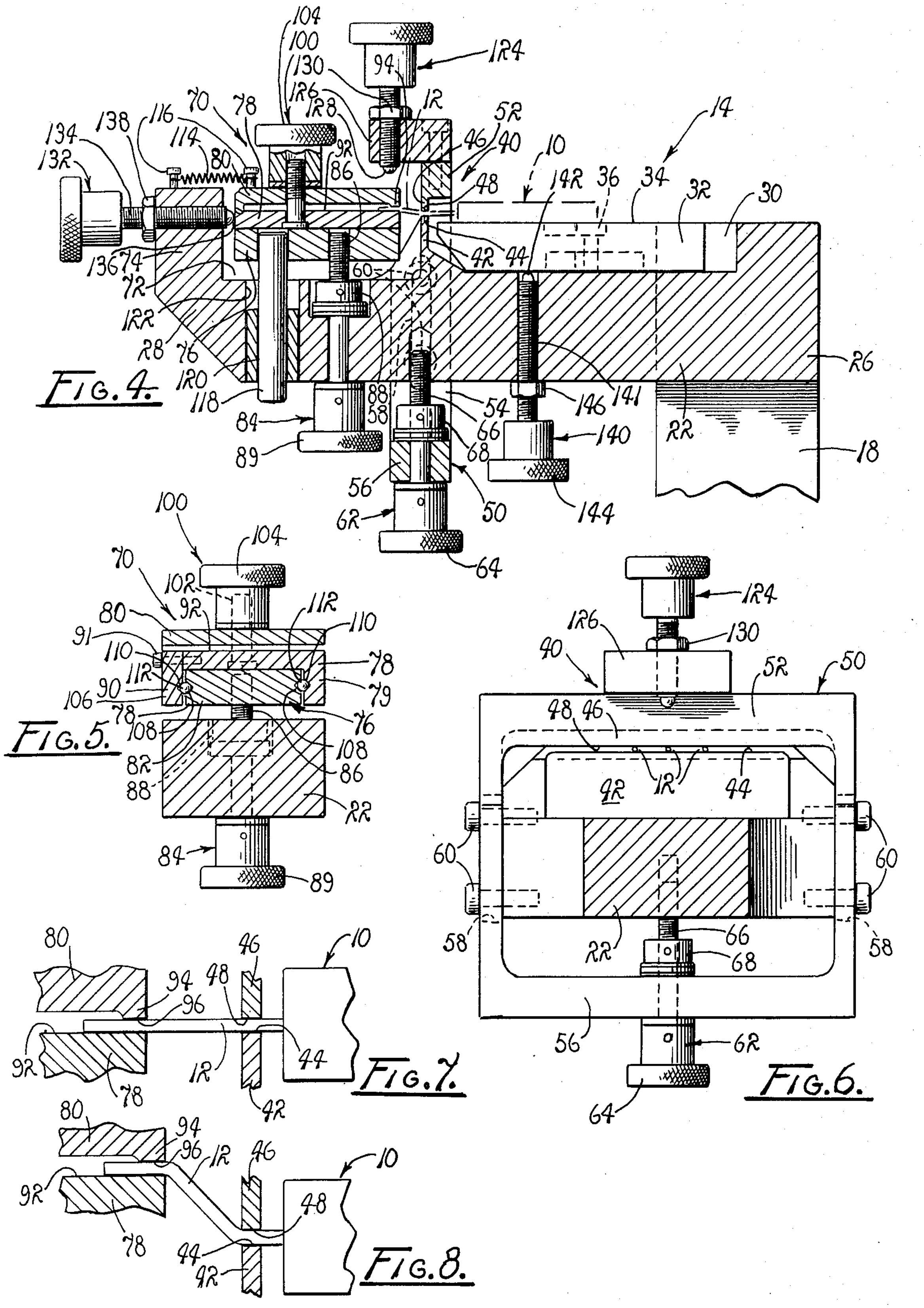
FIG. 4 is a partially sectioned side view of the device.
FIG. 5 is a vertical sectional view taken generally along line 5—5 of FIG. 3.
FIG. 6 is a cross sectional view taken generally along line 6—6 of FIG. 3.
FIGS. 7 and 8 are fragmentary views which collectively depict a sequence in which the leads are configured employing a device which embodies the principles of the instant invention.

In order to effect a repositioning of the blade 46 relative to the anvil 42, there is provided a manually operable jack-screw 62, FIG. 4, extended vertically through the base beam 56 of the yoke 50 and threaded upwardly into the frame 22. As a practical matter, the jack-screw 62 includes a knurled knob 64 for facilitating manipulation. The knob is affixed to the lowermost end of a threaded shaft 66 and includes a bearing face plate, not designated, which seats against the beam 56. A bearing collar 68 also is pinned to the shaft 66 and cooperates with the knob 64 for coupling the jack-screw 62 with the yoke 50. It is to be understood that by appropriately applying torque to the knob 64, the shaft 66 is displaced relative to the frame 22, whereupon the yoke 50 is displaced for varying the position of the blade 46 relative to the anvil 42.

In spaced relation with the inboard lead lock 40 there is provided an outboard lead lock 70. The outboard lead lock 70 is seated in a relief 72 machined or otherwise appropriately formed in the head end 28, of the frame 22, adjacent to the inboard lead lock 40. The relief 72 is, in effect, defined between a vertical end wall 74 and the anvil 42 of the inboard lead lock 40.

The outboard lead lock 70 is supported by a carriage assembly 76 which includes a carriage 78 having a depending skirt 79. The carriage supports a clamping plate 80 superimposed thereon.

The carriage 78 also includes an undercarriage block 82 supported within the relief 72 by a jack-screw 84. The jack-screw is provided with a shaft 86 threaded upwardly and into the block 82 and is supported against vertical motion by a bearing collar 88 pinned to the shaft 86 and seated in an appropriately configured recess, not designated. A suitable knurled knob 89, including a bearing plate, is pinned to the lowermost end of the shaft 86 and serves to accommodate a manipulation of the jack-screw 84, whereby the shaft is selectively torqued for displacing the block 82 in a vertical plane. The carriage 78 includes an adjustable face plate 90 paralleling the skirt 79 and coupled with the carriage by adjustable thumb screws 91. The carriage also is provided with an upper surface 92 of a planar configuration. This surface serves to receive simultaneously the distal end portions of the leads 12 as they are projected through the inboard lead lock 40.

In practice, the region of the upper surface 92 of the carriage 78 located adjacent to the inboard lead lock 40 functions as an anvil while the portion of the clamping plate 80 located adjacent the lead lock 40 includes a depending jaw 94 of a blade-like configuration. As a practical matter, the jaw 94 is of a configuration quite similar to that of the blade 46 and includes a downwardly directed planar surface 96 paralleling the upper surface 92 of the carriage 78 adjacent to the inboard lead lock. It will therefore be appreciated that the distal ends of the leads 12, received by the carriage 78, are in operation secured in place relative to the carriage by forcibly displacing the jaw 94 downwardly into a clamping relation with the leads.

The jaw 94 of the clamping plate 80 is forcibly displaced by manipulating a lock screw 100 coupled with the clamping plate. The lock screw includes a threaded shaft 102 anchored in the carriage and extended into a threaded opening formed in a knurled knob 104 seated on the upper surface of a clamping plate 80. As a practical matter, the shaft 102 extends through a suitable opening formed in the clamping plate 80 so that the clamping plate is forced downwardly simply by manipulating the knob 104 for advancing the knob 104 along the shaft 102. Similarly, a reversed manipulation of the knob 104 serves to release the clamping plate 80 for upward vertical motion, whereby the jaw 94 is released relative to the surface 92 of the carriage 78.

It is, for reasons which will hereinafter become more readily apparent, desirable to afford the carriage 78 readily induced rectilinear motion in a horizontal plane. Such motion is afforded through bearing rails 106 which extend along opposite sides of the block 82 and support the carriage 78. The bearing rails 106 include a pair of grooves 108 machined in parallelism along the opposite vertical surfaces of the block 82 and a pair of grooves 110 machined in the adjacent surfaces of the depending skirt 79 and the face plate 90 of the carriage 78.

The grooves 108 and 110 are disposed in juxtaposition and are arranged so as to constitute substantial mirror images, each of the other. Within the grooves 108 and 110 there is deposited a plurality of ball bearings 112 in a manner such that the ball bearings are common to adjacent grooves 108 and 110 so that the carriage 78 is supported thereby for rectilinear motion. The adjustable face plate 90 is appropriately shimmed in order to assure that proper freedom of motion is afforded the ball bearings 112 as the thumb screws 91 are tightened.

In practice, a pair of tension springs 114 is provided for biasing the carriage 78 against linear motion. Each of the tension springs 114 is anchored at one end thereof to the end wall 74 and at the other end thereof to the clamping plate 80. Suitable pins 116 are provided for this purpose. Consequently, motion of the carriage 78 along the bearing rails 106 toward the inboard lead lock 40 is effected against the applied forces of the pair of springs 114.

It has, in practice, been found desirable to provide a guide pin 118 for supporting the carriage assembly 76 against rotation as the jack-screw 84 is manipulated. The guide pin 118 preferably is anchored in a suitable manner within the block 82 and extended downwardly through a bushing 120, FIG. 4, suitably seated in a vertically oriented bore 122 extended through the frame 22. While a single guide pin 118 functions quite satisfactorily, it is, of course, apparent that any number of such pins can be provided as found desirable.

As a practical matter, a stop pin 124 is threaded downwardly through a bracket 126 affixed to the beam 52 of the yoke 50 so that the lowermost end thereof is positioned to engage the upper surface of the clamping plate 80 for restricting the upward motion imparted to the carriage 78 by the jack-screw 84. The stop pin also is provided with a bearing surface 128 and a lock nut 130. The bearing surface is so disposed as to engage the upper surface of the clamping plate 80 while the lock nut 130 serves to assure a proper positioning of the bearing surface 128, relative to the upper surface of the clamping plate 80.

A similar stop pin 132 is threaded horizontally through the end wall 74 of the frame 22 and is employed in initially positioning the carriage 78. The stop pin 132 includes a screw-threaded shaft 134 which terminates in a bearing surface 136, and a stop nut 138 for securing the bearing surface 136 at a predetermined location. Thus the carriage 78 is positionable within the relief 72 for initially locating the outboard lead lock 70 relative to the inboard lead lock 40 for receiving the leads 12.

In practice, the circuit boards 10 from which the leads are projected may vary in thickness. Therefore, in the interest of universality, it is desirable to provide an adjusting pin 140 for selectively repositioning the plate 32 at an appropriate elevation within the relief 30 so that leads 12 are received within the inboard lead lock 40 without requiring that they be stressed. The pin 140 also is of a construction similar to that of the pins 124 in that the pin 140 includes a screw-threaded shaft 141 terminating in a bearing surface 142 disposed in engagement with the plate 32. A knurled knob 144 is provided to afford an axial repositioning of the stop pin. A nut 146 also is provided for maintaining a selected position for the bearing surface 142, relative to the plate 32, once established.

OPERATION

It is believed that in view of the foregoing description, the operation of the device will be readily understood and it will be briefly reviewed at this point.

With the device 14 assembled in the manner hereinbefore described, a circuit board 10 having a plurality of leads 12 extended in a common direction therefrom is seated on the plate 32 within the relief 30. In practice, the leads 12 are extended across the planar surface 44 of the anvil 42 and into a received relationship with the upper surface 92 of the carriage 78. The stop pin 40 is then manipulated for elevating, or lowering, the plate 32 within the relief 30 so that the base portions of the leads 12 are free from weight-induced stress as they are seated on the surface 44 of the anvil 42. In a similar manner and for a similar purpose, the carriage 78 is repositioned in a vertical plane.

With the circuit board 10 and leads 12 thus related to the carriage 78 and the plate 32, the blade 46 is lowered, through a manipulation of the jack-screw 62 for thereby forcing the surface 48 of the blade 46 into a clamping engagement with the leads 12 as they extend across the surface 44 of the anvil 42. Similarly, the lock screw 100 is manipulated for forcing the jaw 94 into a clamping engagement with the distal end portions of the leads 12 as they are extended across the upper surface 92 of the carriage 78. Thus, the leads 12 are fixed against displacement relative to the inboard lead lock 40 and the outboard lead lock 70.

It will, of course, be appreciated that the carriage 78 is positioned in a horizontal plane relative to the inboard lead lock 40 by manipulating stop pin 132, preparatory to clamping the distal ends of the leads 12 to the carriage 78. The precise position of the carriage is dictated, at least in part, by the length of the leads. Similarly, the magnitude of the angle of the bend to be imparted to the leads is determined by the extent of the distance through which the carriage 78 is elevated. Therefore, the stop pin 124 is manipulated for repositioning the bearing surface 128 relative to the upper surface of the clamping plate 80.

The carriage 78 is elevated simply by manipulating the jack-screw 84 in an appropriate direction for causing the block 82 to be elevated relative to the relief 72. Elevation of the block, of course, causes the carriage 78 to be elevated, whereupon tension is imposed on the leads 12. This tension is maintained at a tolerable level through a horizontal displacement of the carriage 78 along the bearing rails 106. Thus, tensile stress in the leads 12 is accommodated. Of course, motion of the carriage 78 along the bearing rails 106 is against the applied forces of the pair of tension springs 114. Therefore, the constant of the springs 114 is a selected value. Once the leads have been suitably defaced by elevating the carriage 78, the leads are released from the lead locks and the circuit board 10 removed from the plate 32. The device 14 is now conditioned to be readjusted to receive another circuit board of any practicable dimension and configuration having leads of any practicable dimension.

In view of the foregoing, it is believed that it should readily be apparent that the device of the instant invention provides a practical solution to the perplexing problem of supplying a tool having a high degree of universality for use in assembling circuits and circuit components without regard to their similarity.

Although the invention has been herein shown and described in what is conceived to be the most practical and preferred embodiment, it is recognized that departures may be made therefrom within the scope of the invention, which is not to be limited to the illustrative details disclosed.

I claim:

1. A device for simultaneously configuring multiple leads comprising:

A. means for supporting a circuit board having mounted thereon an electrical circuit including multiple deformable leads projected therefrom;

B. means including an inboard lead lock for securing the base end portions of said projected leads against motion relative to the circuit board;

C. means including an outboard lead lock spaced from said inboard lock for receiving the distal end portions of said projected leads; and D. means for simultaneously varying the position of the base end portions of the leads relative to the distal end portions thereof.

2. The device of claim 1 wherein said outboard lead lock includes a carriage and means for securing thereto said distal end portions of the leads.

3. The device of claim 2 further comprising means supporting said carriage for simultaneous motion in a pair of orthogonal planes.

4. The device of claim 3 further comprising manually operable means for imparting vertical motion to said carriage.

5. A device for simultaneously configuring multiple leads protected from printed circuits mounted on a circuit board comprising:

A. a portable base;

B. a receptacle for a circuit board mounted on said base;

C. an inboard lead lock supported by said base for receiving leads projected from a circuit board situated within said receptacle, including means for securing the base portions of said projected leads against motion relative to the circuit board;

D. an outboard lead lock spaced from said inboard lead lock for receiving the distal end portions of said projected leads and means for clamping said distal end portions of said projected leads within said outboard lead lock;

E. means including a carriage supporting said outboard lead lock for simultaneous motion in a pair of orthogonal planes; and F. means for imparting vertical motion to said carriage.

6. The device of claim 5 wherein said carriage includes a block supported by said base, and bearing means mounted on said block supporting the carriage for rectilinear motion in a substantially horizontal plane.

7. The device of claim 6 wherein said means for imparting vertical motion to the carriage includes a vertically oriented, manually operable jack-screw received in threaded engagement within said block.

8. The device of claim 7 further comprising biasing means connected with said carriage for biasing said carriage against motion in a horizontal plane.

9. The device of claim 8 wherein said means for securing the base portions of said projected leads within the inboard lead lock includes means defining an anvil for receiving said leads and means including a manually displaceable blade for clamping said leads to said anvil.

10. The device of claim 9 wherein said means mounted on said carriage for clamping the distal ends of the projected leads within the outboard lead lock includes a manually displaceable jaw supported by said carriage.

11. A lead configuring device comprising:

A. a frame having a back base end and a forward head end;

B. said frame having an upper supporting surface adjacent said back base end;

C. said frame having a first locking means forward of said upper supporting surface;

D. said first locking means comprising an anvil and a displaceable blade adapted to be clamped against said anvil;

E. a second locking means forward of said first locking means and having a clamping plate and a displaceable element adapted to clamp against said clamping plate;

F. means for elevating and lowering said second locking means relative to said anvil of said first locking means.

12. The device of claim 11 including a carriage supporting said second locking means, said carriage being slidably mounted and being movable toward and away from said anvil.

13. The device of claim 12 including means for biasing said carriage in a position away from said anvil, a manually operable threaded stop pin supported by said frame adjacent said carriage for moving said carriage toward said anvil.

14. The device of claim 11 including means for adjusting the position of said upper supporting surface toward and away from said anvil and vertically of said anvil.

* * * * *